US008093875B2

(12) United States Patent
Sun

(10) Patent No.: US 8,093,875 B2
(45) Date of Patent: Jan. 10, 2012

(54) SYSTEM AND METHOD FOR CABLE RESISTANCE CANCELLATION

(75) Inventor: Liming Sun, Tustin, CA (US)

(73) Assignee: IGO, Inc., Scottsdale, AZ (US)

( * ) Notice: Subject to any disclaimer, the term of this patent is extended or adjusted under 35 U.S.C. 154(b) by 1079 days.

(21) Appl. No.: 11/986,750

(22) Filed: Nov. 26, 2007

(65) Prior Publication Data

US 2009/0134709 A1   May 28, 2009

(51) Int. Cl.
G05F 1/00   (2006.01)
(52) U.S. Cl. ........................... 323/281; 323/284
(58) Field of Classification Search ............ 174/113 R; 340/870.39, 636.12, 636.13, 636.15, 660, 340/664; 330/278, 279, 282, 284, 288, 291, 330/292, 293; 323/234, 273, 274, 280–284
See application file for complete search history.

(56) References Cited

U.S. PATENT DOCUMENTS

| | | | | |
|---|---|---|---|---|
| 6,836,101 B2 * | 12/2004 | Lanni | ........................... | 323/274 |
| 7,145,312 B2 * | 12/2006 | Lanni | ........................... | 320/114 |
| 7,365,524 B2 * | 4/2008 | Lanni | ........................... | 323/274 |
| 7,646,107 B2 * | 1/2010 | Smith | ........................... | 307/11 |
| 7,834,612 B2 * | 11/2010 | Sohnis et al. | ................. | 323/318 |
| 2005/0248391 A1 | 11/2005 | Itoh | | |

FOREIGN PATENT DOCUMENTS

| | | |
|---|---|---|
| JP | 07-104870 | 4/1995 |
| JP | 2005-165924 | 6/2005 |
| JP | 2008-034978 | 2/2008 |

OTHER PUBLICATIONS

PCT; International Preliminary Report on Patentability dated Nov. 25, 2010 in Application No. PCT/US2009/043818.
PCT International Search Report and Written Opinion issued Dec. 18, 2009 for PCT/US2009/043818, 11 pages.

* cited by examiner

*Primary Examiner* — Richard V Muralidar
(74) *Attorney, Agent, or Firm* — Snell & Wilmer L.L.P.

(57) ABSTRACT

A method for cable resistance cancellation. A single remote sense line and a simple cable resistance cancellation network are leveraged in a power supply unit to compensate for the total cable voltage drop, while maintaining tight output accuracy. By completely compensating for the voltage drops, the wire gauge for the main power wires can be reduced, thereby allowing the use of smaller diameter cables.

18 Claims, 3 Drawing Sheets

SYSTEM AND METHOD FOR CABLE RESISTANCE CANCELLATION

FIELD OF THE INVENTION

The present invention is generally related to power supply cables, and more specifically to power supply cable resistance cancellation.

BACKGROUND OF THE INVENTION

For an external power supply, the output cable wire resistance will cause load regulation issues, as the current drawn from the load varies. Cable wire gauge and length will also affect the output voltage accuracy as the resistance of the load changes. Traditionally, in order to maintain tight output accuracy, the output cable and circuits have incorporated two remote sense wires which are able to compensate for the total cable voltage drop. Another technique used is lowering the gage (increasing the diameter) of the output wire to lessen the effects of the voltage drop. Lack of voltage drop compensation means that output cables have to be sized with large AWG wire to minimize the IR drops and that open circuit (no load) output voltage had to be programmed high to minimize the effects of the drops. Also, output cables had to be limited to a maximum length for a given wire gauge so the drops at high current did not become excessive.

Solutions using an interchangeable tip connector can accommodate for cable voltage drops, but require two remote sense wires in the cable, leading to two additional connector pins in the tip, to achieve the voltage correction. Adding a second remote sense wire and two more tip connector pins increase the weight and size of the cable and tip connector, thereby adding unneeded bulk and weight for a user. A single wire solution would have only compensated for half the drop passively and would have required an active stage to compensate for the entire drop on the positive and negative leads. The active compensation would have placed a length restriction on an output cable as well.

Voltage programming, as done in Mobility Electronics' Juice 70 product line, uses a resistor in a tip which is connected in parallel with a voltage sampling potentiometer chain in a base unit. The tip resistor shares a common ground with the high current ground return, so any load transients in the cable ground lead are transmitted back to the base unit and affect the output voltage. The voltage programming was limited to a pre-set minimum voltage defined by the reference in the base unit. This meant that no passive tip could force the base unit output voltage below the preset minimum (thus, no ability to upgrade the power supply to operate over a wider voltage range other than changing the base unit). The preset minimum on the Juice products is 15 volts. The voltage programming resistor in the tip was included in the overall feedback loop along with the cabling from the base unit to the programming resistor. This puts a portion of the feedback loop outside the base unit, making loop compensation more difficult.

FIG. 1 discloses a 4-wire prior art example of a voltage programming system 100. In this example, note that load current, $I_L$, flows through the ground path shared by $R_{122}$. Noise or transients on this ground or picked up by the Vsense line cannot be filtered by the addition of bypass capacitors (across $R_{114}$ or $R_{122}$) as this would place an extra pole on integrator U1 outside its local feedback loop. This external low frequency pole would make loop compensation difficult and degrade the transient response of the base unit. Also, the distributed capacitance of the cable itself produces a similar pole at higher frequencies, again contributing to problems in compensating the feed back loop.

SUMMARY OF INVENTION

The present invention achieves technical advantages as a method for cable resistance cancellation. One embodiment of the invention utilizes a single remote sense line and a simple cable resistance cancellation network in a power supply unit to compensate for the total cable voltage drop, while maintaining tight output accuracy. By completely compensating for the voltage drops, the wire gauge for the main power wires can be reduced, thereby allowing the use of smaller diameter cables.

DETAILED DESCRIPTION OF THE PRESENT INVENTION

Figure 1:
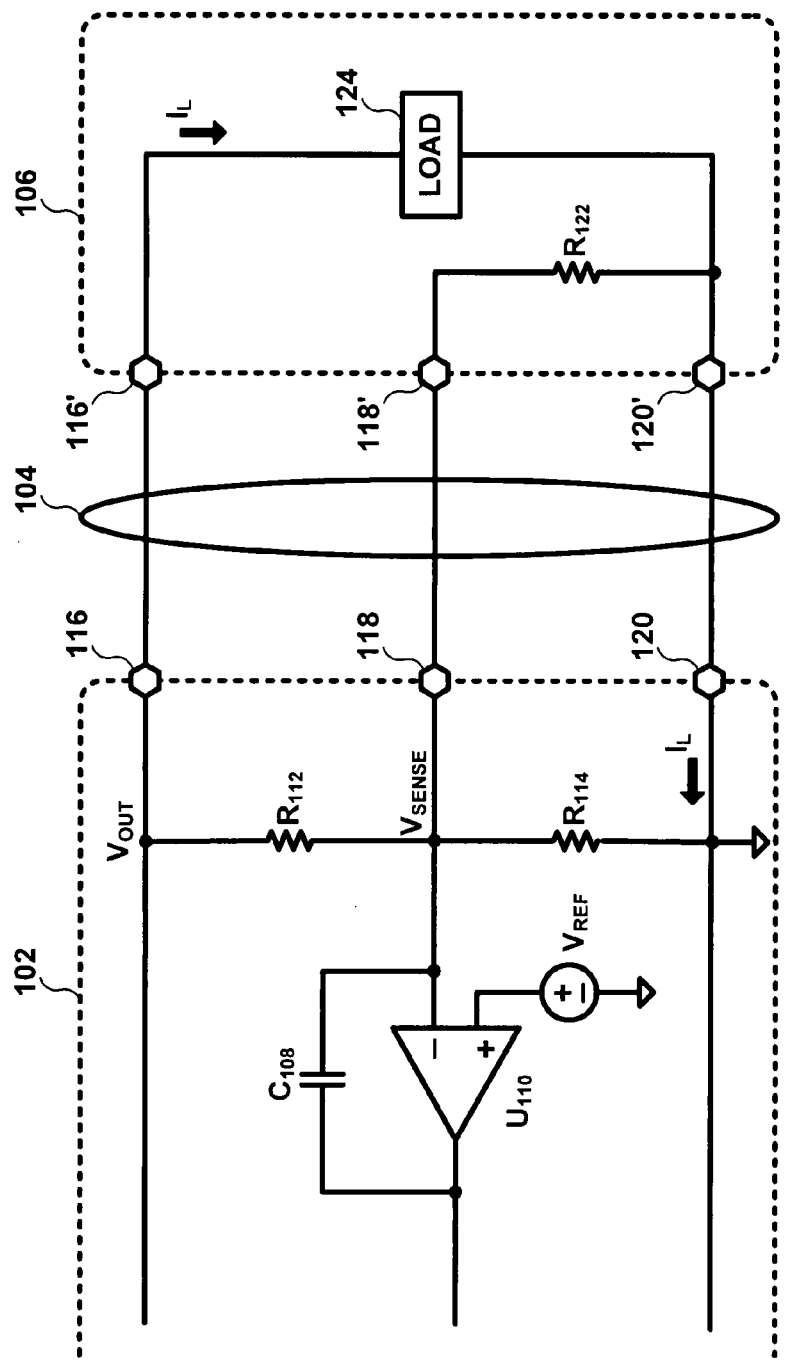
FIG. 1 is a diagram of a prior art voltage programming system.
Figure 2:
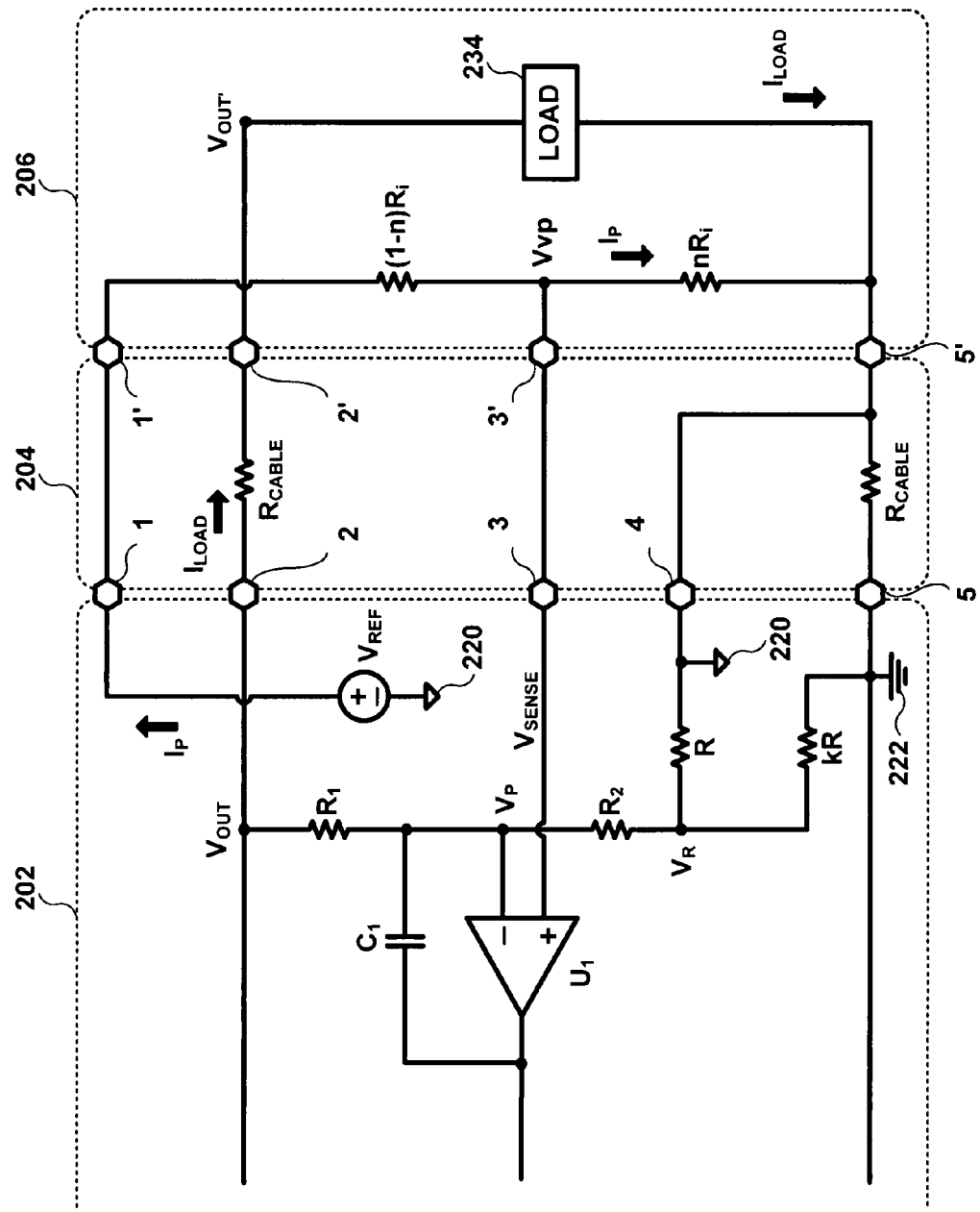
FIG. 2 is a diagram of an output voltage programming system in accordance with an exemplary embodiment of the present invention.

Referring now to FIG. 2, there is shown at 200 a diagram of an output voltage programming system in accordance with an exemplary embodiment of the present invention. Voltage programming system 200 compensates for cable voltage drop, while maintaining tight voltage output accuracy. Voltage programming system 200 is comprised of base unit 202, cable 204, and tip 206.

Base unit 202 contains a standard voltage comparator/integrator amplifier U1 with feedback from the internal Vout signal. The Vout feedback is attenuated by the resistor network of R1 and R2. The other input to this amplifier is from a resistor divider in tip 206. The tip resistor divider sets the output voltage for the tip output connector. Also in base unit 202 is voltage reference, Vref, that is used to provide a current to tip 206 in order to establish 2.5V at the top of the tip resistor divider. This current will vary as discussed later based on the total value of the tip resistor divider. Base unit 202 has a base resistor divider composed of R and kR. These two resistors provide the compensation for the cable voltage drops as output load current varies. They are typically low resistance value, 1% tolerance resistors. Note that the R and kR resistors are connected across analog ground 220 and the internal power ground 222. This connection provides the sampling of cable voltage drop that allows the compensation to work.

Cable 204 connects base unit 202 to tip 206, and is made with 5 wires on the adapter side and 4 wires on the tip 206 side. Pins 1 and 5 are heavy duty current carrying pins and the rest are low current signal pins. A Kelvin connection is made in cable 204 at the tip 206 end from pin 4 to pin 5. With the cable voltage drop compensation the voltage drop in cable 204 in both directions is completely eliminated. This would seem to imply that the usual heavy gauge wire that is used in the power leads could be reduced significantly to make cable 204 smaller. Care must be used in sizing the power leads so that the loss in cable 204 does not degrade the overall adapter and cable efficiency so much that the CEC and EnergyStar requirements cannot be met. Also, any cable 204 voltage drop compensation is made up in tip 206 itself with a higher Vout voltage. This means that the output voltage range of base unit 202 must take this higher compensating output voltage into account, in circuit and magnetics design.

Tip 206 contains the two resistors used to set the output voltage and output current limiting. The current limiting is set by computing the total value (Ri) of the two resistors in the resistor divider made up of nRi and (1−n)Ri. The output voltage of the Tip is set by controlling the ratio of the two resistors by the factor n, where n<1.

In this new architecture the voltage and current limit programming share a common resistance in the tip labeled Ri. The total value of Ri defines the current limit point and the ratio of the upper and lower resistors that make up Ri define the adapter output voltage. For this explanation of voltage programming, the voltage at the top of Ri will be assumed to be equal to an internal adapter reference called Vref equal to 2.5 volts. As will be shown, the value of Vref can be changed as long as the values of R1, R2, R and kR are changed as well.

To program the Tip output voltage (compensated voltage delivered to the Tip output pins) the following equation is used:

$$Vout' = \frac{(R1 + R2)}{R2} \cdot (Vref) \cdot n \quad \text{Equation A}$$

Where $R_1$ and $R_2$ are fixed by the architecture and the variable n defines the output voltage. Referring to FIG. 2. resistor $R_1$ is set to 102K Ω and $R_2$ to 11.3K Ω.

The $R_1$ and $R_2$ values chosen are the nearest 1% E96 values that produce a voltage division ratio closest to 10. In this case the 102K Ω and 11.3K Ω give a ratio of 10.026549. For the purpose of this derivation that number will be rounded down to 10. The choice of 10 for a ratio is made so that in case of a loss of sense ground in the tip the maximum output voltage for n=1 would be limited to 25 v. This would not exceed the typical over voltage protection level of 28 volts on most power supplies. Substituting in 10 for the ratio n in Equation A yields the following equation:

$$Vout' = 10 \cdot (2.5 \text{ v}) \cdot n \quad \text{Equation B}$$

In order to produce an output voltage in the range of 12 volts to 24 volts, the variable n must have a value in the range of 0.48 to 0.96, respectively. This n value is independent of the total value of $R_1$ in the tip. The compensation resistors R and kR are controlled by the values of $R_1$ and $R_2$. The resulting values for R and kR are 14.7Ω and 118Ω respectively. These values are chosen to be low so they do not appreciably affect the voltage at the junction of $R_1$ and $R_2$.

Figure 3:
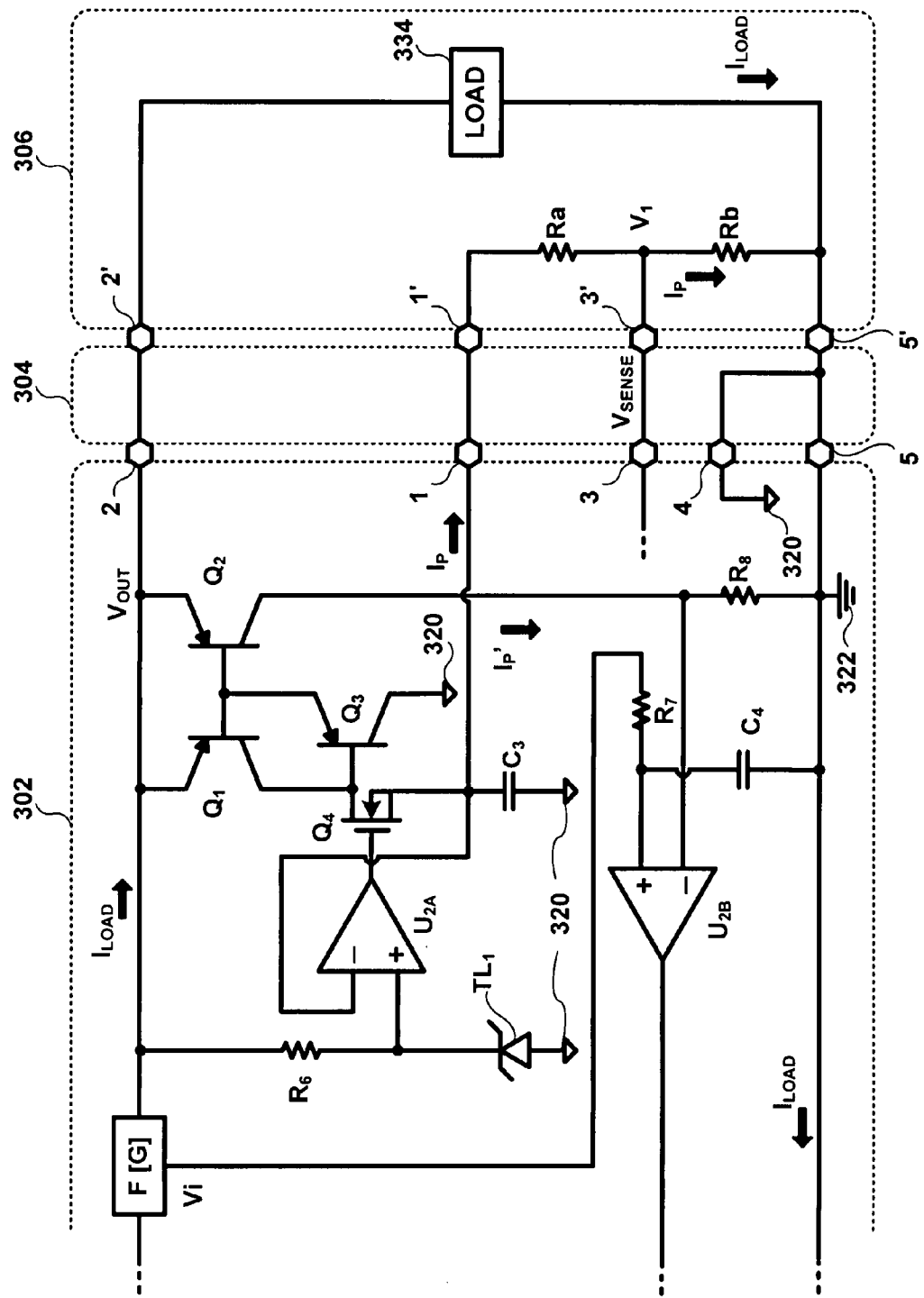
FIG. 3 is a diagram of an output current limiting system in accordance with an exemplary embodiment of the present invention.

Referring now to FIG. 3, there is shown at 300 a diagram of an output current limiting system in accordance with an exemplary embodiment of the present invention.

The limiting current is set by the total value of Ri, where Ri is defined by:

$$Ri = \frac{Vref \cdot G^{-1}}{Ilimit} \quad \text{Equation C}$$

wherein Vref=2.5 V, G=100 uA/A, and Ri=$R_a$+$R_b$.

The G term defines the transfer function of the current mirror composed of Q1-Q4. This transfer function is fixed within the architecture, but the Vref, conversion gain of the current mirror defined by $R_8$ and the gain F[G] of the current sensor on the base unit can all be variables as long as the G term remains at 100 uA/A.

This demonstrates the development of the formulas for the voltage drop compensation provided by R and kR. Also, the dependency of R and kR on R1 and R2 is shown. On the inverting input of U1 a voltage Vp is developed from Vout, and the network of R1, R2, R, kR and the return load current It, flowing in one leg of the output cable between pins 5' and 5. The purpose of the compensation network is to sample the current ($I_{load}$) returning from the load, convert that current into a voltage ($I_{load}$*Rcable) and apply a portion of that voltage to raise the voltage Vp proportional to the load current. By raising Vp, the Vout voltage will be raised to offset the voltage drops in the output cabling. The equations for Vout and Vp are derived below and the subsequent compensation of the tip voltage Vout for cable drops due to load current Iload is shown.

Care is needed in picking the R value used in the compensation network. Since k is a dimensionless and constant, any starting value of R could be used. However, in order to keep errors to a minimum in the system, some guidelines for R are presented.

First, because (R+kR) is effectively in parallel with the cable resistance, rcable, the value of R (and subsequently kR) should not be so low as to carry appreciable branch current. A good rule of thumb is for R+kR to be three orders of magnitude greater than the largest single leg resistance expected in the cable and connectors. For example, for a 6 foot output cable with 18 AWG wire and two connectors the total resistance could be: (0.03 ohms/connector*2 connectors)+(6 feet*0.006 ohms/foot)=0.096 ohms. Rounding up to 0.1 ohms yields a minimum value of 1000*0.1 ohms=100 ohms for R+kR. At a 10 amp load current the branch current in R+kR is only 10 mA, thus 0603 resistors can be used and the measurement error due to the branch current stealing is only 0.1%.

At low currents the compensation effects of R and kR are minimal. However, the parallel combination kR and (R+Rcable) is effectively in series with the lower voltage setting resistor R2. If It is chosen too large this added resistance will increase the apparent resistance of R2 and this will consequently cause the ratio of R1 and R2 to be in error. This error will result in a lower than expected output voltage. A good rule of thumb is to keep the parallel combination of R and kR less than 1% of the value of R2 (Rcable can be ignored since it is very small). For example, if R2=11.3K Ω, then R∥kR should be less than 113Ω. For the values of R=14.7Ω and kR=118Ω the parallel combination is <14.7Ω which satisfies the requirement. In this case the proportion of the R and kR combination to R2 is 13.1 Ω/11.3K Ω=0.12% of R2.

$$Vp = m \cdot (Vout - Vr) + Vr \quad \text{Equation 1}$$
$$\text{where } m = \frac{R2}{R1 + R2}$$

When the system is in balance the negative and positive terminals of U1 are equal and this leads to:

$$Vp = m \cdot (Vout - Vr) + Vr = V_{VP} + Iload \cdot Rcable \quad \text{Equation 2}$$

Vr is relative to the internal GND point and Vvp is relative to the pin 5' ground in the tip.

Substituting for m in Equation 1, yields:

$$Vp = \frac{R2}{R1+R2} \cdot Vout + Vr \cdot \left(1 - \frac{R1}{R1+R2}\right), \text{ but}$$

$$1 - \frac{R2}{R1+R2} = \frac{R1}{R1+R2}, \text{ thus}$$

Equation 3

$$Vp = \frac{R2}{R1+R2} \cdot Vout + Vr \cdot \frac{R1}{R1+R2},$$

$$\text{and } Vr = \frac{kR}{R+kR} \cdot Iload \cdot Rcable$$

Equation 4

Substituting for Vr in Equation 4, yields:

$$Vp = \frac{R2}{R2+R2} \cdot Vout + \frac{R1}{R1+R2} \cdot \left(\frac{kR}{R+kR} \cdot Iload \cdot Rcable\right)$$

Equation 5 and from Equation 2, Equation 5 becomes:

$$Vp = \frac{R2}{R1+R2} \cdot V_{out} + \frac{R1}{R1+R2} \cdot \left(\frac{kR}{R+kR} \cdot Iload \cdot Rcable\right)$$

$$= V_{VP} + Iload \cdot Rcable$$

Equation 6

Rewriting Equation 6 gives:

$$Vp = \frac{R2}{R1+R2} \cdot Vout + \frac{R1}{R1+R2} \cdot \left(\frac{kR}{R(1+k)} \cdot Iload \cdot Rcable\right)$$

$$= Vvp + Iload \cdot Rcable$$

Through simplification:

$$Vp = \frac{R2}{R1+R2} \cdot Vout + \frac{R1}{R1+R2} \cdot \left(\frac{k}{1+k} \cdot Iload \cdot Rcable\right)$$

$$= Vvp + Iload \cdot Rcable$$

Dropping $V_p$ and setting the solution in terms of Vout yields:

$$Vout \cdot \frac{R2}{R1+R2} =$$

$$Vvp + Iload \cdot Rcable - \left(\frac{R1}{R1+R2} \cdot \frac{k}{k+1} Iload \cdot Rcable\right)$$

Equation 7

Now, rearranging Equation 7 to find Vout:

$$Vout = Vvp \frac{R1+R2}{R2} + Iload \cdot Rcable \cdot \frac{R1+R2}{R2} -$$

$$\left(\frac{R1}{R1+R2} \cdot \frac{k}{k+1} \cdot Iload \cdot Rcable\right) \cdot \frac{R1+R2}{R2}$$

Equation 8 or, finally:

$$Vout =$$

$$Vvp \cdot \frac{R1+R2}{R2} + Iload \cdot Rcable \cdot \left(\frac{R1+R2}{R2} - \frac{R1}{R2} \cdot \frac{k}{k+1}\right)$$

Equation 9

Equation 9 now describes the $V_{out}$ voltage inside the adapter brick. This voltage, while interesting, is not of primary concern. The voltage at the end of the cable is most important to regulate and the following derivations show how the compensation is achieved.

The Vout' voltage at the cable end is described by:

$$Vout' = Vload == Vout - (2 \cdot Rcable) \cdot Iload$$

Equation 10

Substituting Equation 9 for Vout leads to:

$$Vout' = Vload$$

$$= V_{VP} \cdot \frac{R1+R2}{R2} + Iload \cdot$$

$$Rcable\left(\frac{R1+R2}{R2} - \frac{R1}{R2} \cdot \frac{k}{k+1}\right) -$$

$$(2 \cdot Rcable) \cdot Iload$$

Equation 11

And simplifying again gives:

$$Vout' = Vload$$

$$= V_{vp} \cdot \frac{R1+R2}{R2} + Iload \cdot Rcable \cdot$$

$$\left[\frac{R1+R2}{R2} - 2 - \left(\frac{R1}{R2} \cdot \frac{k}{k+1}\right)\right]$$

A key observation is if the term inside the brackets can be made to equal zero, then the effects of Iload and Rcable are eliminated and Vout'becomes independent of cable length and load current. Vvp is independent of load current and only depends on the ratio of Ra and Rb in the tip. For this reason Vvp can be treated as a constant. Thus, setting the bracketed term=0 and re-arranging the parentheses yields:

$$\left[\frac{R1+R2}{R2} - 2 - \left(\frac{R1}{R2} \cdot \frac{k}{k+1}\right)\right] = 0$$

Equation 12

Re-arranging:

$$\frac{R1+R2}{R2} - 2 = \frac{R1}{R2} \cdot \frac{k}{k+1}$$

Euler's method is applied to the left side of the equation:

$$\frac{R1+R2}{R2} \cdot \frac{R2}{R2} - 2\frac{R2}{R2}$$

This yields:

$$\frac{(R1+R2)-2 \cdot R2}{R2}$$

Which is:

$$\frac{R1-R2}{R2}$$

Substituting back into Equation 12 yields:

$$\frac{R1-R2}{R2} = \frac{R1}{R2} \cdot \frac{k}{k+1} \quad \text{Equation 13}$$

Now multiplying both sides by R2 and moving R1 yields:

$$\frac{R1-R2}{R1} = \frac{k}{k+1} \quad \text{Equation 14}$$

Solving for k:

$$\frac{R1}{R1-R2} = \frac{k+1}{k} = \frac{k}{k} + \frac{1}{k} = \frac{1}{k}+1$$

so:

$$\frac{R1}{R1-R2} - 1 = \frac{1}{k}$$

now with a lowest common denominator (LCD) on the left:

$$\frac{R1}{R1-R2} - \frac{R1-R2}{R1-R2} = \frac{R1-R1+R2}{R1-R2} = \frac{1}{k}$$

yielding:

$$k = \frac{R1-R2}{R2} \quad \text{Equation 15}$$

This k value represents the ratio of the two compensation resistors R and kR. Once R1 and R2 are set, then k can be determined from Equation 15. This cancellation network can be used with Mobility's programming power supply and any external power supply with 2 voltage sense wires.

As a check, this equation will be substituted back into Equation 11 for k, to verify the terms are equal to 0. From Equation 11:

$$Vout' =$$
$$Vload = Vvp \cdot \frac{R1+R2}{R2} + Iload \cdot Rcable \cdot \left[ \frac{R1+R2}{R2} - 2 - \left( \frac{R1}{R2} \cdot \frac{k}{k+1} \right) \right]$$

and $$\frac{k}{k+1} = \frac{R1-R2}{R1}$$

from Equation 14.

Substituting into Equation 11:

$$Vout' = Vload =$$
$$Vvp \cdot \frac{R1+R2}{R2} + Iload \cdot Rcable \cdot \left[ \frac{R1+R2}{R2} - 2 - \left( \frac{R1}{R2} \cdot \frac{R1-R2}{R1} \right) \right]$$

so, $$Vout' =$$
$$Vload = Vvp \cdot \frac{R1+R2}{R2} + Iload \cdot Rcable \cdot \frac{R1+R2-2 \cdot R2 - R1 + R2}{R2}$$

But, $$\frac{R1+R2-2 \cdot R2 - R1 + R2}{R2} = 0,$$

so:

$$Vout' = Vload = Vvp \frac{R1+R2}{R2}$$

thereby verifying the original assumption.

Advantageously, the tip programming is achieved by first by selecting the value of R1 that gives the desired Ilimit from Equation C, then the value of n from Equation A that defines the output voltage at the tip is selected. This n value defines the ratio of Ra to Rb in the tip.

The present invention derives technical advantages because first, other solutions can't reduce the number of wires in the output cable to 5. Additionally, two of the wires are the same small AWG for current carrying and three wires are smaller with only signal voltages and currents. The base unit interface has 5 pins and the tip interface connector has 4 pins. The voltage drops in the cable are 100% compensated for by the addition of a single 5th wire in the cable and 2 resistors in the base unit. The output cable can be thinner since the voltage drop in the cable is compensated in the base unit (this advantage must be balanced with the CEC and EnergyStar efficiency requirements).

The present invention achieves further technical advantages because voltage drop compensation is independent of cable length and wire gauge and can reduce the error due to voltage drops by a factor of 100 or more. Moreover, the tip components that program the output voltage and current are now completely outside the feedback loop so loop compensation is simplified and cable noise can be bypassed without creating extra feedback poles. The output voltage range of a properly designed base unit could be programmed from its maximum rated output all the way down to 0.0 volts with passive components in the tip. High currents in the power or ground leads do not affect the loop transient response and have minimal affect on the output voltage programming.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A voltage programming circuit, comprising:
  a base unit adapted to provide an output voltage;
  a cable adapted to couple the output voltage from the base unit to a remote load and create a load voltage;
  a reference line, disposed within the cable, adapted to couple the load voltage at the load back to the base unit;

a cable cancellation network adapted to compensate for total voltage drop between the base unit and the load due to the cable; and a tip adapted to operably and securely couple the cable to the load;

wherein the load voltage is:

$$Vout' = \frac{(R1 + R2)}{R2} \cdot (Vref) \cdot n,$$

wherein Vout' is the value of the load voltage;
Vref is the value of a reference voltage;
R1 is the value of a first resistor;
R2 is the value of a second resistor; and
n is the value of a voltage adjustment.

2. The voltage programming circuit of claim 1, wherein the base unit is a power supply.

3. The voltage programming circuit of claim 1, wherein the load is a portable electronic device.

4. The voltage programming circuit of claim 1, wherein the cable cancellation network is a resistive network.

5. The voltage programming circuit of claim 1, wherein the load voltage is a function of the cable cancellation network.

6. The voltage programming circuit of claim 1, wherein the load voltage is set by controlling the value of n.

7. The voltage programming circuit of claim 6, wherein n<1.

8. The voltage programming circuit of claim 1, wherein Vref is 2.5V.

9. The voltage programming circuit of claim 1, wherein the cancellation network, is defined by the equation:

$$\left[\frac{R_1 + R_2}{R_2} - 2 - \left(\frac{R_1}{R_2} \cdot \frac{k}{k+1}\right)\right] = 0,$$

wherein k is a compensation factor.

10. The voltage programming circuit of claim 9, wherein $$k = \frac{R_1 - R_2}{R_2}.$$

11. A current programming circuit, comprising:
a base unit adapted to provide an output voltage to a load;
a cable adapted to propagate the output voltage from the base unit to the load;
a reference line, disposed within the cable, adapted to propagate the output voltage at the load to the base unit;
a cable cancellation network adapted to compensate for total voltage drop due to the cable; and
a tip adapted to operably and securely engage the load and one end of the cable;

wherein the cable cancellation network is defined by the equation:

$$\left[\frac{R_1 + R_2}{R_2} - 2 - \left(\frac{R_1}{R_2} \cdot \frac{k}{k+1}\right)\right] = 0,$$

wherein R1 is a first resistor value;
R2 is a second resistor value; and
k is a compensation factor.

12. The current programming circuit of claim 11, wherein the base unit is a power supply.

13. The current programming circuit of claim 11, wherein the load is an electronic device.

14. The current programming circuit of claim 11, wherein the cable cancellation network is a resistive network.

15. A voltage programming circuit, comprising:
a base unit adapted to provide an output voltage;
a cable adapted to couple the output voltage from the base unit to a remote load and create a load voltage;
a reference line, disposed within the cable, adapted to couple the load voltage at the load back to the base unit;
a cable cancellation network adapted to compensate for total voltage drop between the base unit and the load due to the cable; and
a tip adapted to operably and securely couple the cable to the load;
wherein an output current is limited with a resistive value, which is a function of the cable cancellation network; and
wherein the resistive value is:

$$Ri = \frac{Vref \cdot G^{-1}}{I\ \text{limit}},$$

wherein I limit is the value of the output current limit;
Vref is the value of the reference voltage;
G is the transfer function of a current mirror; and
Ri is the value of Ra+Rb, wherein Ra is the value of a first resistor in the tip, and wherein Rb is the value of a second resistor in the tip.

16. The voltage programming circuit of claim 15, wherein G is 100 uA/A.

17. The voltage programming circuit of claim 15, wherein Vref is 2.5V.

18. The voltage programming circuit of claim 15, wherein $$k = \frac{R_1 - R_2}{R_2}.$$

* * * * *

UNITED STATES PATENT AND TRADEMARK OFFICE
CERTIFICATE OF CORRECTION

PATENT NO.        : 8,093,875 B2                                           Page 1 of 1
APPLICATION NO.   : 11/986750
DATED             : January 10, 2012
INVENTOR(S)       : Liming Sun It is certified that error appears in the above-identified patent and that said Letters Patent is hereby corrected as shown below:

Claim 10 should read as follows:

The voltage programming circuit of claim 9, wherein $$k = \frac{R1 + R2}{R2}.$$

Claim 18 should read as follows:

The voltage programming circuit of claim 15, wherein $$k = \frac{R1 + R2}{R2}.$$

Signed and Sealed this
Twenty-eighth Day of February, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,093,875 B2 | Page 1 of 1 |
| APPLICATION NO. | : 11/986750 | |
| DATED | : January 10, 2012 | |
| INVENTOR(S) | : Liming Sun | |

It is certified that error appears in the above-identified patent and that said Letters Patent is hereby corrected as shown below:

Column 9, lines 40-44,
Claim 10 should read as follows:

The voltage programming circuit of claim 9, wherein $$k = \frac{R1 + R2}{R2}.$$

Column 10, lines 48-51,
Claim 18 should read as follows:

The voltage programming circuit of claim 15, wherein $$k = \frac{R1 + R2}{R2}.$$

This certificate supersedes the Certificate of Correction issued February 28, 2012.

Signed and Sealed this
Twenty-seventh Day of March, 2012

David J. Kappos
*Director of the United States Patent and Trademark Office*